INVENTORS
JOHN A. KIMBERLEY
ROBERT H. PENNER
BY
Morgan, Finnegan, Durham & Pine
ATTORNEYS.

July 27, 1965     J. A. KIMBERLEY ET AL     3,196,847
FUEL PUMP FOR ROTARY COMBUSTION ENGINES
Filed July 31, 1961     3 Sheets-Sheet 2

INVENTORS
JOHN A. KIMBERLEY
ROBERT H. PENNER
BY
Morgan, Finnegan, Durham & Pine
ATTORNEYS.

United States Patent Office 3,196,847
Patented July 27, 1965

3,196,847
FUEL PUMP FOR ROTARY COMBUSTION
ENGINES
John A. Kimberley, Wayne, and Robert H. Penner, Cedar Grove, N.J., assignors to Curtiss-Wright Corporation, a corporation of Delaware
Filed July 31, 1961, Ser. No. 128,193
9 Claims. (Cl. 123—8)

The present invention relates to means for metering and pumping fuel for a rotating combusion engine, and more particularly to a fuel pump for a rotating combustion engine that can be used to meter and pump fuel into the engine in proportion to the weight of air flow into the engine by sensing pressure changes in the engine combustion chamber.

This invention is applicable to and useful in almost any type of rotary internal combusion engine in which a rotor or inner body rotates relative to a stationary outer body. It is particularly useful in the type of rotary combustion engine that will be described below as the preferred embodiment of the invention. To simplify and clarify the explanation of the invention, the description which follows will, for the most part, be restricted to the use of the invention in a rotary combustion engine of the type described in the preferred embodiment. It will be apparent from the description, however, that with slight modifications which would be obvious to a person skilled in the art, the invention is equally applicable to other types of rotary internal combustion engines in which the rotor or inner body rotates relative to a stationary outer body.

The present invention is particularly useful in rotary internal combustion engines of the type that comprise an outer body having an axis, axially-spaced end walls, and a peripheral wall interconnecting the end walls. In such rotary combustion engines the inner surfaces of the peripheral wall and the end walls form a cavity, and the engine also includes an inner body or rotor that is mounted within the cavity between its end walls.

The axis of the inner body or rotor is eccentric from and parallel to the axis of the cavity of the outer body, and the rotor has axially-spaced end faces disposed adjacent to the end walls of the outer body, and a plurality of circumferentially-spaced apex portions. The rotor is rotatable relative to the outer body, and its apex portions substantially continuously engage the inner surface of the outer body to form a plurality of working chambers that vary in volume during engine operation as a result of relative rotation between the rotor and the outer body.

The inner surface of the peripheral wall of the outer body has a multi-lobed profile that is preferably an epitrochoid, and the number of lobes on this epitrochoid is one less than the number of apex portions of the inner body or rotor.

The rotary internal combustion engine includes an intake passage means for administering a fuel-air mixture to the variable volume working chambers, an exhaust passage means communicating with the working chambers, and suitable ignition means so that during engine operation the working chambers of the engine undergo a cycle of operation which includes the four phases of intake, compression, expansion, and exhaust.

This cycle of operation is achieved as a result of the relative rotation of the inner body or rotor and outer body, and for this purpose both the inner body or rotor and outer body may rotate at different speeds, but preferably the inner body or rotor rotates while the outer body is stationary. The present invention is limited to use in combination with the type of rotary combustion engine in which the inner body or rotor rotates while the outer body is stationary. This type of rotating combustion engine is also the most usual form that the engine takes in practical applications.

For efficient operation of the engine, its working chambers should be sealed, and, therefore, an effective seal is provided between each rotor apex portion and the inner surface of the peripheral wall of the outer body, as well as between the end faces of the rotor and the inner surfaces of the end wall of the outer body.

Between the apex portions of its outer surface the rotor has a contour which permits its rotation relative to the outer body free of mechanical interference with the multilobed inner surface of the outer body. The maximum profile which the outer surface of the rotor can have between its apex portions and still be free to rotate without interference is known as the "inner envelope" of the multilobe inner surface, and the profile of the rotor which is illustrated in the accompanying drawings approximates this "inner envelope."

For purposes of illustration, the following description will relate to the present preferred embodiment of the engine in which the inner surface of the outer body defines a two-lobed epitrochoid, and in which the rotor or inner body has three apex portions and is generally triangular in cross-section but has curved or arcuate sides.

It is not intended that the invention be limited, however, to the form in which the inner surface of the outer body approximates a two-lobed epitrochoid, and the inner body or rotor has only three apex portions. In other embodiments of the invention the inner surface of the outer body may have a different plural number of lobes with a rotor having one more apex portion than the inner surface of the outer body has lobes.

In a rotary combustion engine of the type described above, the pressure in the working chamber at any angle of shaft rotation during compression is approximately proportional to the weight of the intake air charge. The pressure in the working chamber during compression is, therefore, responsive to throttle changes and ambient pressure changes, since throttle changes and ambient pressure changes directly affect the weight of the intake air charge.

The pressure in the working chamber during compression is not responsive to contamination by exhaust gases or ambient temperature changes. However, the effects of contamination of the intake air charge by exhaust gases and ambient temperature changes are minor on engine performance.

Accordingly, it is possible to use the compression pressure in the working chamber undergoing compression as a signal that can be used in conjunction with appropriate means, to be discussed, to meter and pump fuel into the engine in proportion with the weight of intake air flow.

This use of compression pressure to meter and pump a quantity of fuel proportional to the weight of intake air charge is possible in a rotary combustion engine in which the outer body remains stationary because the compression cycle occurs in one area of the outer body and the expansion cycle in another as contrasted with a conventional internal combustion engine in which both cycles occur in the same general area of the cylinder or working chamber.

The present invention makes it possible to use the compression pressure of the engine to both pump and meter fuel in a quantity proportional to the maximum value of the compression pressure at a selected location in the peripheral wall of the outer body. The pressure at the location selected also goes through periods of values below atmospheric pressure, and the present invention makes it possible to use this phenomenon as the means for recharging the fuel pump.

It is a primary object of the present invention to provide a novel fuel pump for a rotary combustion engine that will sense the weight of intake air charge and meter and pump a quantity of fuel charge to the engine that is proportional to the weight of the intake air charge.

Another object of the instant invention is to provide a novel fuel pump for a rotary combustion engine that will respond to throttle changes and meter and pump a quantity of fuel for the air-fuel charge proportional to such changes.

It is another object of the present invention to provide a novel fuel pump for a rotary combustion engine that is responsive to ambient pressure changes and will meter and pump a quantity of fuel proportional to such ambient pressure changes.

It is another object of the present invention to provide a novel fuel pump for a rotary combustion engine that will meter and pump fuel for the engine fuel charge in a quantity proportional to the maximum value of the compression pressure at a selected location along the peripheral wall of the outer body.

It is another object of the instant invention to provide a novel fuel pump for a rotary combustion engine that will sense the pressure at a selected location along the peripheral wall of the outer body and that includes means to make use of the phenomenon that at certain periods of the engine cycle the pressure at this location becomes less than atmospheric to accomplish recharging of the fuel pump.

To achieve the foregoing objects, and in accordance with its purpose, the present invention provides means that as embodied and broadly described, comprises a probe or sensing tube open to the working chamber of the engine at a selected location on the peripheral wall of the outer body in the area of the outer body where the engine undergoes at least a portion of the compression cycle, fuel pump means connected to the probe and responsive to pressure changes sensed by the probe to pump fuel in a quantity proportional to the maximum pressure sensed by the probe, and means for directing fuel from the pump to the intake passage means of a rotary combustion engine.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

The invention consists in the novel parts, constructions, arrangements, combination, and improvements shown and described.

The accompanying drawings which are incorporated in and constitute a part of the specification, illustrate one embodiment of the invention, and, together with the description serve to explain the principles of the invention.

In the accompanying drawings illustrating the mechanical aspects of the present invention, it is believed that the showing of the fundamental construction, functions, originality and advantages of the invention may be more easily understood when certain details of practical construction are omitted, where these details form no part of the claimable invention, are well-known to those skilled in the art, and could be incorporated in the present invention by any skilled workman. These details may consist of means for lubrication, such as, oil cups, grooves, reservoirs, seals, wipers, and O-rings; means for reduction of friction, such as, bushings, ball bearings, and roller bearings; means for sealing off various spaces or areas to confine fluid pressures to their functional locale, such as, packing, packing glands, O-rings, and gaskets; constructional details of fluid conducting means, such as, tube or pipe joints, unions, and elbows including supporting and securing means; and such other comparable means and devices that may be omitted for the sake of clarity.

Figure 2:
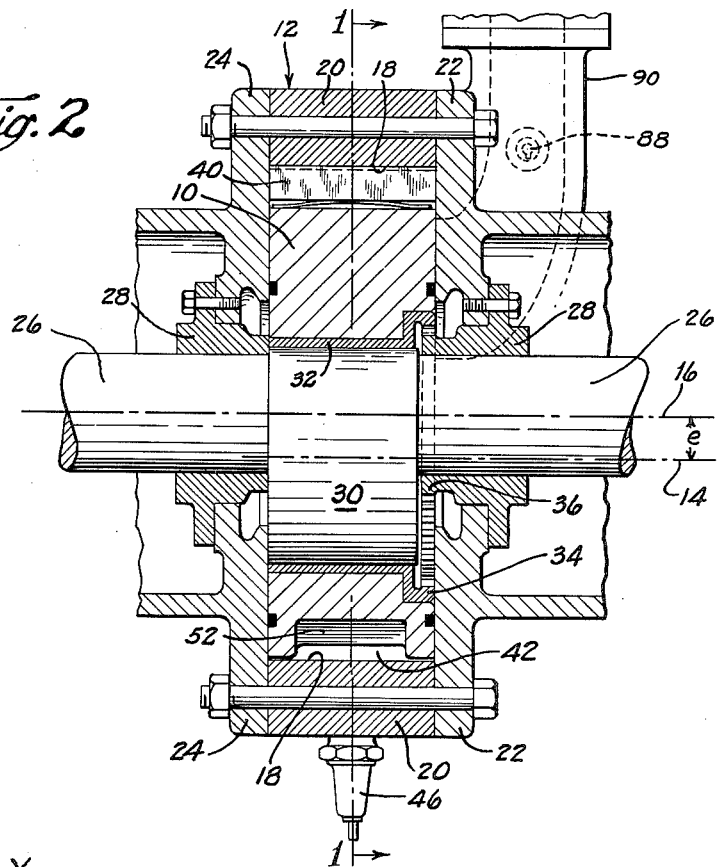
FIG. 2 is a central vertical section of the rotary combination engine taken along the line 2—2 of FIG. 1.
Figure 3:
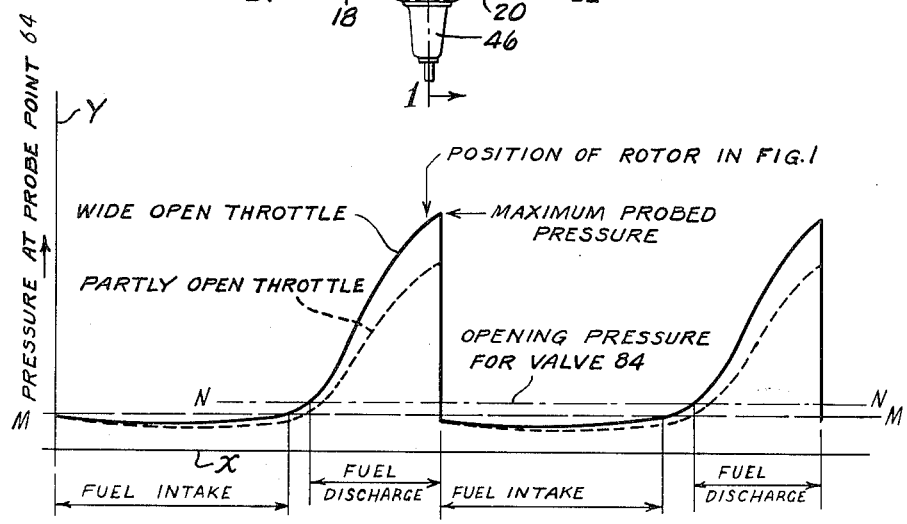
Figure 4:
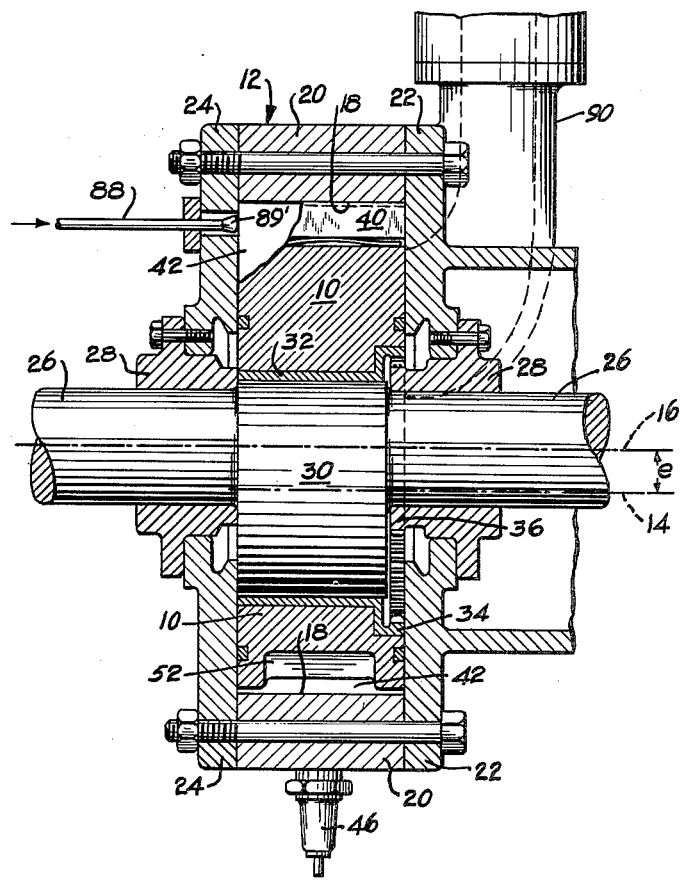

FIG. 3 is a schematic or graphical view showing a plot of the relationship between the engine cycle and the pressure at the location of the probe or sensing means for the pump. For clarity two successive cycles of the engine are shown in FIG. 3 and the relative pressure values are shown for the engine when operating both at wide open throttle and at part throttle; and FIG. 4 is a view similar to FIG. 2, showing a modified embodiment.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

In accordance with the invention, a rotary combustion engine and a novel fuel pump for use in combination with the engine are provided. As embodied, and as shown in FIGS. 1 and 2, the present preferred embodiment includes a rotary combustion engine comprising a generally triangular rotor 10 having arcuate sides which is eccentrically supported for rotation within an outer body 12.

Figure 1:
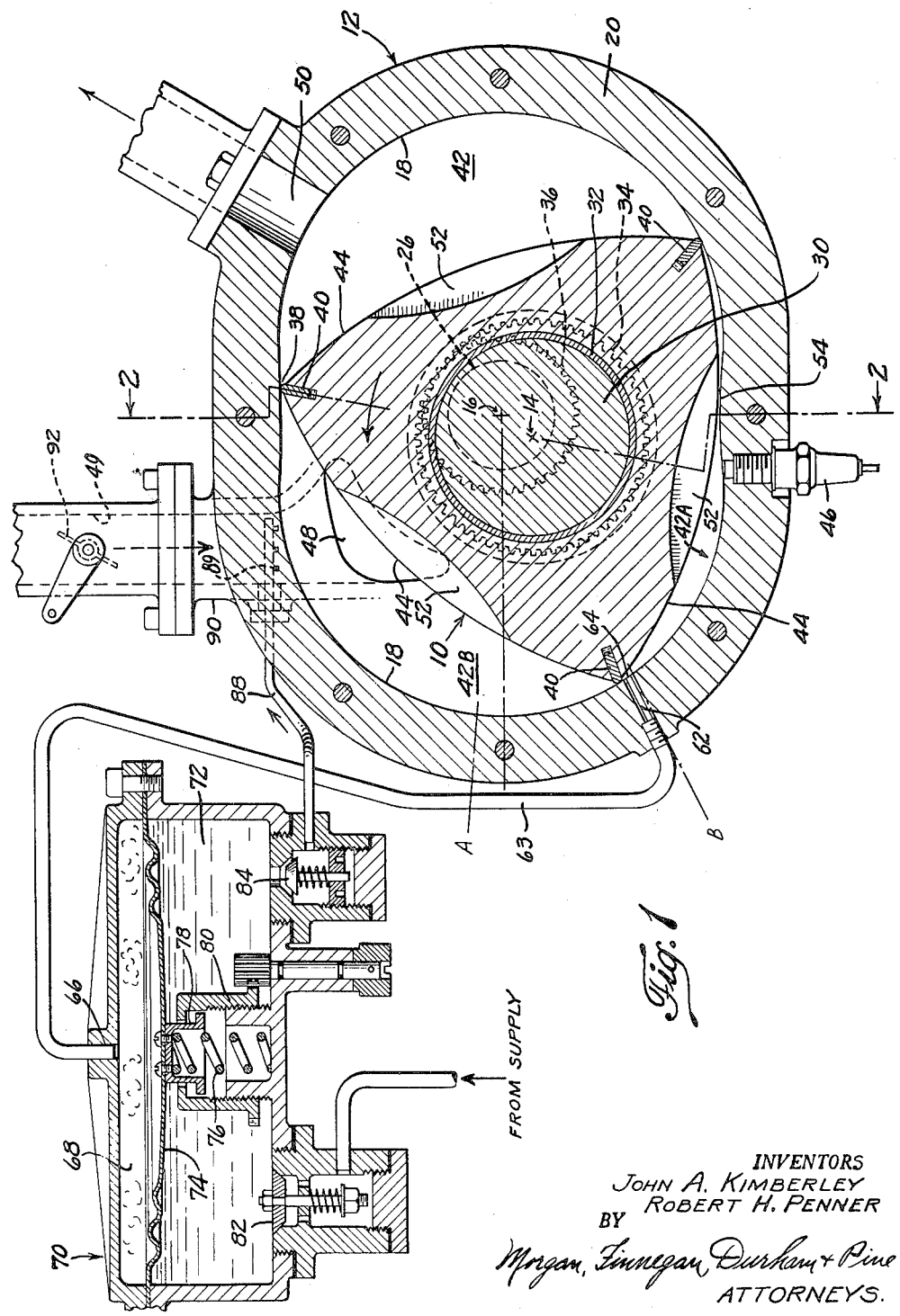
FIG. 1 is a sectional view of a rotary combustion engine taken along the line 1—1 of FIG. 2 and showing the rotor positioned within the outer body in combination with a preferred embodiment of the fuel pump means of the present invention.

As shown in FIGS. 1 and 2 and as here preferably embodied, the rotor 10 rotates on an axis 14 that is eccentric from and parallel to the axis 16 of the curved inner surface of the outer body 12. The distance between the axes 14 and 16 is equal to the effective eccentricity of the engine and is designated $e$ in the drawings. The curved inner surface 18 of the outer body 12 has basically the form of an epitrochoid in geometric shape and includes two arched lobe-defining portions or lobes.

As embodied, the generally triangular shape of the rotor 10 corresponds in its configuration to the "inner envelope" or the maximum profile of the rotor which will permit interference-free rotation of the rotor 10 within the outer body 12.

In the form of the invention illustrated, the outer body 12 comprises a peripheral wall 20 that has for its inner surface the curved inner surface 18, and a pair of axially-spaced end walls 22 and 24 that are disposed on opposite sides of the peripheral wall 20 and secured thereto.

The end walls 22 and 24 support a shaft 26, the geometric center of which is coincident with the axis 16 of the outer body 12. This shaft 26 is supported for rotation by the end walls 22 and 24 on large and ample bearings 28. A shaft eccentric 30 is rigidly attached to or forms an integral part of the shaft 26, and the rotor 10 is supported for rotation or rotatively mounted upon the shaft eccentric 30 by a rotor bearing 32 that is fixed to the rotor.

As shown in FIGS. 1 and 2, an internally-toothed ring gear 34 is rigidly attached to one end face of the rotor 10. The ring gear 34 is in mesh with an externally-toothed gear or pinion 36 that is rigidly attached to the stationary end wall 22 of the outer body 12.

From this construction, it may be observed that the gearing 34 and 36 does not drive or impart torque to the shaft 26 but merely serves to index or register the position of the rotor 10 with respect to the outer body 12 as the rotor rotates relative to the outer body and removes the positioning load which would otherwise be placed upon the apex portions of the rotor 10.

As shown most clearly in FIG. 1, the rotor 10 includes three apex portions 38 that carry radially movable sealing members 40. The sealing members 40 are in substantially continuous gas-sealing engagement with the inner surface 18 of the outer body 12 as the rotor 10 rotates within and relative to the outer body 12.

By means of the rotation of the rotor 10 relative to the outer body 12, three variable volume working chambers 42 are formed between the peripheral working faces 44 of the rotor 10 and the inner surface 18 of the outer body 12. As embodied in FIG. 1, the rotation of the rotor relative to the outer body is counterclockwise and is so indicated by an arrow.

A spark plug 46 is mounted in the peripheral wall 20 of the outer body 12, and at the appropriate time in the engine cycle, the spark plug 46 provides ignition for a compressed combustible mixture that, on expansion, drives the rotor in the direction of the arrow.

Also as shown in FIG. 1, one lobe of the epitrochoid surface 18 is provided with an intake port 48, and the other lobe is provided with an exhaust port 50. As the rotor 10 rotates, a fresh charge is drawn into the appropriate working chamber 42 through the intake port 48. This charge is then successively compressed, ignited, expanded, and finally exhausted through the exhaust port 50.

All four successive phases of the engine cycle: intake, compression, expansion, and exhaust, take place within each one of the variable volume working chambers 42 each time the rotor 10 completes one revolution within the outer body, and for each revolution of the rotor, the engine completes a cycle.

The working faces 44 of the rotor 10 are provided with cut-out portions or channels 52 that permit combustion gases to pass freely from one lobe of the epitrochoidal inner surface 18 to the other lobe, when the rotor is at or near the dead center of maximum compression position. Also, a desired compression ratio of the engine may be attained by appropriate proportioning of the volume of the channels 52.

Since the gear ratio between the rotor ring gear 34 and the outer body gear or pinion 36 is 3:2, each time the rotor 10 completes one revolution about its own axis 14, the shaft 26 rotates three times about its axis 16.

As the engine operates, the various phases of the cycle of the engine working fluid in the working chambers 42 take place adjacent to the same portion of the outer body 12. Thus, for each working chamber 42 combustion is initiated by the spark plug 46, that is located adjacent to the lobe junction 54 of the peripheral wall 20 of the outer body.

With the rotor 10 in the position of FIG. 1, the lower working chamber 42A is approximately in a position just previous to initiation of combustion in this chamber, and combustion preferably would be initiated just prior to maximum compression in the chamber 42 after the apex of the rotor has passed port 62. Similarly to the spark plug 46, the engine intake port 48 and exhaust port 50 successively serve each of the working chambers 42, and these ports are on the side of the outer body peripheral wall 20 opposite to the spark plug 46.

Compression takes place as a working chamber moves from a position of maximum volume, provided when the rotor working face 44 is opposite a portion of the inner surface 18 of the outer body roughly between the intake port and the spark plug, to a position of minimum volume. The chamber 42 opposite the spark plug 46 in FIG. 1 is in a position just previous to reaching its minimum volume position. In this latter position the working chamber 42 is close to the dead center of maximum compression position and combustion would ordinarily be initiated shortly after the chamber 42 opposite the spark plug 46 is in the position shown in FIG. 1.

An area of the inner surface 18 of the outer body 12 will experience compression during part of each cycle of the engine. Portions of this area of the inner surface 18 that experiences compression during certain periods of the engine cycle also experience less than atmospheric pressure during other periods of the engine cycle when these portions form a part of the working chamber that is undergoing the intake phase of the engine cycle.

This area of the inner surface 18 that experiences both compression, when it forms a part of the working chamber undergoing compression, and pressure less than atmospheric, when it forms a portion of the chamber undergoing intake provides a theoretical location for a pressure sensing means that can be used to both meter and pump fuel for injection in the intake passage 49 or directly into the working chamber 42 itself.

As a practical matter, the entire area of the inner surface 18 that experiences both compression and pressure less than atmospheric is not suitable as a location for a pressure sensing means as used in the present invention. The practical area available for location of the pressure sensing means is determined by two limits within the larger theoretical area.

One limit, indicated by position A in FIG. 1, is determined by the requirements that the pressure sensed by the sensing means must reach a maximum value sufficiently high at part throttle to operate the fuel pump, as will more specifically appear below. The other limit, indicated by position B in FIG. 1, is determined by the fact that the pressure sensed must not be excessive at full throttle, i.e., if too high a pressure were sensed and transferred to the pump, it could cause damage to the pump at full throttle. In addition, the limiting position B for the pressure sensing means is such that combustion is not initiated in a chamber 42A until after the apex seal 40 at the trailing end of this chamber has passed beyond this limiting B position.

The range of the inner surface 18 provided within these limits is thus the range or areas of practical use in which the sensing means may be located. This range must also be in the area in which the sensing means will experience a sufficiently low pressure so that the pump can be recharged, and this latter requirement will be explained more fully below.

As shown in FIG. 1, the range for locating the pressure sensing means along the inner surface 18 is between the positions A and B. As already indicated, the limiting position A is such that the maximum pressure at this position is sufficient to operate the fuel pump 70. As illustrated, the rotary engine inner surface 18 is a two-lobed epitrochoid having a K factor of 7 where $$K = \frac{R}{e}$$

and R is the radius of the rotor from its center to the point of contact with the inner surface 18 of an apex portion 38 of the rotor and e is the distance between the axis 14 of the rotor and the axis 16 of the outer body. In the case of such an engine, the limiting position A for the pressure sensing means lies no more than approximately 5° (against the direction of rotor rotation) from the major axis (horizontal in FIG. 1) of the epitrochoid in order to provide a sufficient pressure to operate the pump 70.

Each working chamber 42 of the engine preferably fires ahead of its top dead center position, for example by an angle of 30° as measured on the shaft 26. If each working chamber fires 30° before the top dead center position, then for an engine having a two-lobed epitrochoid with a K factor of 7 as described, the limiting position B for the pressure sensing means lies no more than approximately 25° (in the direction of rotor rotation) from the major axis of the epitrochoid, otherwise the chamber 42A would fire before its trailing apex seal 40 had passed the pressure sensing means.

In accordance with the invention, means are provided for sensing the pressure within this area of the inner surface that experiences both compression pressure and pressure less than atmospheric during the engine cycle and within the smaller range or area described above. As embodied in the preferred embodiment shown, this means comprises a port 62 which, as shown in FIG. 1, is in the limiting B position. As preferably embodied, port 62 is open at one end to the compression section of the inner surface 18 as shown at 64 and connected by a tube 63 to a port 66 in a pressure chamber 68 within a combined fuel meter and pump 70.

In accordance with the invention, means are provided to use the pressure changes sensed by the probe 62 to both meter and pump fuel into the intake port 48 of the engine. As embodied in this preferred embodiment, this means is a combined fuel meter and pump as shown in FIG. 1.

As here preferably embodied, the fuel meter and pump 70 includes a pressure chamber 68 and a fuel chamber 72. A diaphragm 74 separates the pressure chamber 68 from the fuel chamber 72. The diaphragm 74 is biased toward the pressure chamber 68 by spring means 76. A spring holder 78 holds the spring 76 in position against the diaphragm 74 and cooperates with mechanical stop means 80 to limit the bias of the diaphragm toward the pressure chamber 68.

The stop means 80 is adjustable to permit adjustment of the richness of the fuel-air mixture fed to the intake port 48. The further the bias of the diaphragm 74 toward the pressure chamber 68 permitted by the stop means 80, the richer will be the air-fuel mixture.

Fuel is admitted to the fuel pump 70 through an inlet check valve 82 and fuel is expelled from the fuel pump through an outlet check valve 84 as shown in FIG. 1. The fuel supply line (FIG. 1) is maintained under a continuous small amount of positive pressure to ensure that there will be a positive feed of fuel to the pump 70. Outlet valve 84 is lightly biased in the closing direction to insure that this valve closes during fuel intake into the pump chamber 72 since otherwise air would be drawn into the pump chamber through the conduit 88.

A plot of the pressure at the engine end 64 of the port 62 against time is shown for two successive cycles of the engine in FIG. 3. The pressure at 64 is plotted on the Y axis and time is plotted on the horizontal or X axis. The pressure conditions at the engine end 64 of the probe when the engine is at wide open throttle are shown in solid line, and the pressure conditions at the engine end 64 of the probe when the engine is at part throttle are shown in broken line.

The minimum pressure in pump chamber 68 sufficient to balance the pressure of the fuel in chamber 72 and the force of the spring 76 is represented on FIG. 3 by the horizontal line M—M and the probe pressure in chamber 68 sufficient to force the diaphragm 74 downwardly against the spring 74 and to open the check valve 84 to thereby pump fuel into the engine is somewhat greater and is represented on FIG. 3 by the horizontal line N—N. As illustrated in FIG. 1 this output from the pump 70 flows through the fuel conduit 88 and discharges from fuel nozzles 89 into the intake passage 49 for the working chambers.

In the case of a non-supercharged engine, for a portion of the engine cycle when the working chamber connected to the port 62 is undergoing intake, the pressure at the port 62 and in pump chamber 68 will be quite low and will drop below atmospheric pressure. The pressure represented by M—M is somewhat above atmospheric, depending on the pressure of the fuel supplied to the chamber 72 and on the force exerted by the spring 76 on on the diaphragm 74.

When a working chamber begins to undergo compression the probe 62 and pump chamber 68 will sense higher pressures and as compression continues the pressure will rise quite sharply and reach a substantial value before it suddenly drops to a low below atmospheric value again when an apex seal 40 of the rotor 10 passes the engine end 64 of the probe 62.

As also shown in FIG. 3, when the engine is operating at part throttle the pressures throughout remain at a lower level. The low pressure is further below the value indicated by the line M—M than at wide open throttle, while the higher pressure is considerably less throughout the cycle than at wide open throttle and is quite markedly less than the maximum value of positive pressure that is reached at wide open throttle. When the pressure at the probe 62, and, therefore, in the chamber 68, exceeds that indicated by the line N—N, the pump diaphragm 74 is moved downwardly by this pressure to open the check valve 84, thereby forcing fuel through the line 88 into the engine. This fuel injection into the engine continues until the pressure at the probe 62 again drops to a low value. As indicated on FIG. 3 there is a time interval between the time fuel intake into the pump ceases and when fuel discharge from the pump begins. This time interval results from the time required for the pressure in the pump chamber 68 to build up from the value indicated at M—M to the value indicated at N—N. As already stated, fuel intake ceases when the pressure in the chamber 68 reaches a value, indicated at M—M, which is sufficient to balance the resultant of the fuel pressure force against the pump diaphragm 74 and the force of the spring 76 against the diaphragm. Fuel is not discharged from the pump into the engine until the pressure in the pump chamber 68 reaches the higher value indicated at N—N whereupon fuel injection into an engine working chamber 42B takes place. This fuel injection continues until the leading apex seal 40 of chamber 42B passes the probe 62.

In operation the invention will be described with reference to FIGS. 1 and 3. As shown in FIG. 1, the rotor 10 is in a position within the outer body 12 at which an apex seal 40 of the rotor is about to move past the engine end 64 of the port 62. At this point in the cycle the pressure in the working chamber 42A is approaching the maximum pressure which can be sensed by the port 62 and tube 63. The maximum pressure will be reached at the instant before the trailing apex seal 40 of the chamber 42A actually moves past the engine end 64 of the port 62.

As shown in FIG. 1, the port 62 and tube 63 transmit the pressure existing in working chamber 42 to the pressure chamber 68 in the fuel meter and pump 70. The pressure as shown in the pressure chamber 68 in FIG. 1 is considerably greater than atmospheric and is sufficient to move the diaphragm 74 against the bias of the spring means 76 downward against the fuel contained in the fuel chamber 72.

The pressure transmitted from the pressure chamber 68 through the diaphragm 74 to the fuel in the fuel chamber 72 overcomes the bias of the outlet check valve 84 permitting fuel to flow through the fuel conduit 88 and into the intake manifold 90. The setting of spring 76 determines how much fuel is injected into the engine's chamber.

Displacement of the diaphragm 74 against spring means 76 is determined by the magnitude of the peak pressure in chamber 68 that moves the diaphragm against the spring 76. This peak pressure in chamber 68 thus determines the amount of fuel introduced into the engine chamber, or determines how far the diaphragm 74 moves. The amount of fuel injected is thus proportional to the peak pressure in chamber 68 and, therefore, to the amount of air in chamber 68.

The pressure tap through port 64 and tube 63 to chamber 68 measures the pressure in one working chamber 42A of the engine, but through the means provided in the present invention, the pressure in this chamber (42A) is used to control the amount of fuel introduced into the succeeding working chamber 42B of the engine. In operation, the rotor 10 revolves so fast that the weight of intake air charge in chamber 42A will differ by only an insignificant amount from the weight of intake air charge in chamber 42B. There is thus no disadvantage to using the pressure in chamber 42A to control the amount of fuel injected into chamber 42B.

The pressure measured at 64 (FIG. 1) does two things: (1) It controls the output of the fuel pump, and (2) It is a motivating force for the pump.

The fuel nozzles 89 can be located in either the peripheral wall 20 or the end wall 22, 24 of the engine, and the fuel can be injected directly into a working chamber 42. It is not necessary that the nozzles 89 be located in the intake passage 49 proper, as shown in FIG. 1. FIG. 4 shows an embodiment wherein the nozzle 89' discharges directly into a working chamber 42.

When the apex portion 36 of the rotor 10 has moved past the location shown in FIG. 1 and past the engine end 64 of the port 62, the tube 63 then begins to be influenced by the intake phase of the engine cycle and senses a low pressure. This low pressure is transmitted by the tube 63 to the pressure chamber 68. The spring means 76 forces the diaphragm 74 upward responsive to the sudden and large decrease in pressure in the pressure chamber 68. This movement of the diaphragm 74 upward tends to create a vacuum within the fuel chamber 72 permitting the check valve 84 to close and causing the intake check valve bias to be overcome permitting the intake valve 82 to open and admit fuel into the fuel chamber 72 responsive to the slight positive pressure on the fuel supply and to the low pressure in the fuel chamber 72. This fuel intake into the pump chamber 72 continues until the pressure at the probe 62 and therefore in the chamber 68 reaches the value indicated by the line M—M.

At throttle valve 92 is provided in the intake manifold 90 to control the air flow into the engine through the intake port 48. When the throttle valve 92 is wide open the weight of the intake air charge will be at a maximum, since the restriction of flow of air into the engine will be at a minimum.

As shown in FIG. 3, when the throttle is wide open the pressure at 64 will also be at a maximum. Similarly, as shown in FIG. 3, when the throttle is partially closed, the maximum pressure at 64 is proportionally reduced. When the pressure at 64 is reduced the degree of movement downward of the diaphragm 74 responsive to pressure in the pressure chamber 68 will also be reduced. Reduction in the amount of downward travel of the diaphragm 74 causes reduction in the amount of fuel which is pumped through the outlet check valve 84 into the engine through the fuel conduit 88 and nozzles 89.

From the foregoing description of the operation of the present invention, it is apparent that the fuel pump meters and pumps fuel to the engine in proportion to the weight of the intake air charge, as determined by variables such as throttle position and ambient pressure. The present invention thus provides means for automatically proportioning fuel injected into the engine to the weight of the air intake charge. Although the fuel pump of the instant invention does not respond to contamination of the intake charge by exhaust gases or ambient temperature changes, the effect of the latter two conditions on engine performance is minor.

The invention in its broader aspects is not limited to the specific mechanisms shown and described, but also includes within the scope of the accompanying claims any departures made from such mechanisms that do not sacrifice its chief advantages.

What is claimed is:

1. A rotary combustion engine having a hollow outer body and an inner body rotatable relative to the outer body cooperating with the outer body to form a plurality of working chambers therebetween that rotate about the axis of the outer body and cyclically vary in volume as the inner body rotates relative to the outer body to alternately undergo intake and expansion when the volume of said chambers is increasing, and to alternately undergo compression and exhaust when the volume of said chambers is decreasing, and ignition occurring substantially between compression and expansion; air intake passage means communicating successively with each of the chambers during intake; and fuel supply means for supplying an amount of fuel for the combustible mixture in one chamber in accordance with the compression pressure in the preceding chamber comprising pump means containing resilient means, means for directing fluid under pressure communicating between said pump means and said preceding chamber as it undergoes compression, said preceding chamber ceasing to be in communication with said fluid directing means before ignition occurs in said preceding chamber, said fluid under pressure from said directing means being directed to operate said pump means and acting against said resilient means to determine the stroke and hence the output of said pump means, and fuel passage means to transmit the output of said pump means to said one chamber, whereby said fluid under pressure is indicative of and proportional to the mass of air in said preceding chamber such that the quantity of fuel supplied to each chamber during each cycle increases and decreases with increase and decrease in the mass of air supplied to the preceding chamber.

2. A rotary combustion engine having a hollow outer body and an inner body rotatable relative to the outer body and cooperating with the outer body to form a plurality of working chambers therebetween that rotate about the axis of the outer body and cyclically vary in volume as the inner body rotates relative to the outer body to perform alternately intake and expansion when the working chambers increase in volume and alternately compression and exhaust when said chambers decrease in volume with ignition substantially intermediate compression and expansion; air intake passage means supplying air successively to said working chambers; a pressure tap disposed to communicate successively with said working chambers while intake and compression are cyclically occurring in said working chambers but communication being interrupted prior to ignition; fuel supply means for supplying fuel to the chamber next following the chamber undergoing compression; said fuel supply means including a single fuel pump having resilient means therein, fuel supply conduit means to said pump, and fuel injection conduit means from said pump to transport fuel successively to each of the working chambers of the engine; said fuel pump communicating with said pressure tap, fluid under pressure from said pressure tap acting against said resilient means in said pump to vary the length of the stroke and hence the output of said pump according to the fluid pressure, whereby the quantity of fuel supplied to each chamber successively by said pump during each cycle increases and decreases with increase and decrease in the maximum compression pressure sensed by said pressure tap.

3. The invention as defined in claim 2, in which said fuel pump has a pressure chamber, a fuel chamber, and a resilient diaphragm separating the fuel chamber from the pressure chamber; the pressure chamber being connected to the pressure tap whereby compression pressure sensed by the pressure tap will be transmitted through the pressure chamber to the diaphragm and exerted as force proportional to the compression pressure against the diaphragm toward the fuel chamber.

4. The invention as defined in claim 3, in which the fuel pump also includes a normally-closed injection valve between the fuel injection conduit means and the fuel chamber of the pump.

5. The invention as defined in claim 4, in which the fuel pump also includes a normally-closed supply valve between the supply conduit means and the fuel chamber of the pump.

6. The invention as defined in claim 5, in which the fuel in the fuel supply conduit means is maintained at a slight positive pressure; the bias that closes the supply valve having a magnitude such that the bias is overcome by movement of the diaphragm toward the pressure chamber when the pressure tap senses a pressure less than atmospheric.

7. The invention as defined in claim 3, in which the fuel injection conduit means includes at least one fuel nozzle communicating directly with the engine working chamber into which the air is drawn from the air intake passage means.

8. The invention as defined in claim 3, in which the fuel injection conduit means includes at least one fuel nozzle communicating directly with the air intake passage means whereby fuel is injected into the air intake passage means responsive to an increase in pressure in the pressure chamber of the pump that forces the diaphragm toward the fuel chamber.

9. The invention as defined in claim 3, in which the pressure tap communicates successively with the working chambers of the engine within an area of the engine wall that during each cycle of the engine undergoes successively both a pressure of less than atmospheric and a variable maximum compression pressure that is proportional to the mass of air supplied to the working chamber and that is sufficiently higher than atmospheric to move the diaphragm against the fuel chamber and pump fuel out of the fuel chamber of the pump through the fuel supply means and into the working chamber during each cycle of the engine in a quantity proportional to the maximum pressure sensed by the pressure tap; the diaphragm moving toward the pressure chamber when the pressure tap senses a pressure of less than atmospheric whereby the volume of the fuel chamber is increased permitting it to receive more fuel.

References Cited by the Examiner

UNITED STATES PATENTS

| 1,418,548 | 1/22 | Edwards. | |
| 2,592,284 | 4/52 | Hopkins | 123—140.3 |
| 2,861,422 | 11/58 | Magill. | |
| 2,884,919 | 5/59 | Butler. | |
| 2,947,290 | 8/60 | Froede | 123—8 |
| 2,988,065 | 6/61 | Wankel et al. | 123—8 |
| 2,993,482 | 7/61 | Froede | 123—8 |

FOREIGN PATENTS

| 977,530 | 11/50 | France. |
| 1,204,596 | 8/59 | France. |
| 892,697 | 10/53 | Germany. |
| 373,443 | 5/32 | Great Britain. |

KARL J. ALBRECHT, *Primary Examiner.*

JOSEPH H. BRANSON, JR., *Examiner.*